United States Patent
Searls et al.

(12)

(10) Patent No.: US 8,140,906 B1
(45) Date of Patent: Mar. 20, 2012

(54) TECHNIQUES FOR RECOVERING DATA FROM COLD IMAGES

(75) Inventors: Kirk Searls, Maitland, FL (US); Michael Payne, Archer, FL (US)

(73) Assignee: Symantec Corporation, Mountain View, CA (US)

( * ) Notice: Subject to any disclaimer, the term of this patent is extended or adjusted under 35 U.S.C. 154(b) by 282 days.

(21) Appl. No.: 12/345,008

(22) Filed: Dec. 29, 2008

(51) Int. Cl.
*G06F 11/00* (2006.01)

(52) U.S. Cl. .............. 714/36; 714/6.1; 714/6.3

(58) Field of Classification Search ......... 714/5, 6, 714/36, 5.11, 6.3, 6.1
See application file for complete search history.

(56) References Cited

U.S. PATENT DOCUMENTS

| | | | |
|---|---|---|---|
| 6,182,086 B1 * | 1/2001 | Lomet et al. | 1/1 |
| 6,230,285 B1 * | 5/2001 | Sadowsky et al. | 714/14 |
| 6,289,426 B1 * | 9/2001 | Maffezzoni et al. | 711/173 |
| 6,477,629 B1 * | 11/2002 | Goshey et al. | 711/162 |
| 6,748,553 B2 * | 6/2004 | McBride et al. | 714/15 |
| 6,826,707 B1 * | 11/2004 | Stevens | 714/2 |
| 7,203,865 B2 * | 4/2007 | Sullivan | 714/38 |
| 7,340,638 B2 * | 3/2008 | Nicholson et al. | 714/6 |
| 7,650,531 B2 * | 1/2010 | Yeung et al. | 714/5.1 |
| 2002/0042892 A1 * | 4/2002 | Gold | 714/6 |
| 2005/0210316 A1 * | 9/2005 | Benhase et al. | 714/6 |
| 2007/0043969 A1 * | 2/2007 | Schneider | 714/6 |
| 2007/0234104 A1 * | 10/2007 | Shih et al. | 714/6 |
| 2008/0155332 A1 * | 6/2008 | Landers et al. | 714/36 |
| 2010/0070800 A1 * | 3/2010 | Hanna | 714/6 |

OTHER PUBLICATIONS

Unknown, "Product Brief—CA ARCserve® Backup R12", CA™ Transforming IT Management, 8 pages, Copyright 2007.
Unknown, "A CommVault White Paper: CommVault® Galaxy™ Backup & Recovery" CommVault Systems, Inc., 42 pages, Copyright 2008.

* cited by examiner

*Primary Examiner* — Yolanda L Wilson
(74) *Attorney, Agent, or Firm* — Wilmer Cutler Pickering Hale and Dorr LLP

(57) ABSTRACT

Techniques for recovering data from cold images are disclosed. In one particular exemplary embodiment, the techniques may be realized as a computer implemented method for recovering data from cold images comprising searching storage associated with a target recovery device, identifying one or more data structures on the storage, parsing the one or more identified data structures, and recovering one or more portions of the one or more parsed data structures.

20 Claims, 3 Drawing Sheets

TECHNIQUES FOR RECOVERING DATA FROM COLD IMAGES

FIELD OF THE DISCLOSURE

The present disclosure relates generally to recovery of data and, more particularly, to techniques for recovering data from cold images.

BACKGROUND OF THE DISCLOSURE

Storage associated with a system whose operating system is not running may be referred to as a cold image. Recovery of one or more portions of a cold image may be desired. However, access to a file system of a volume or other storage unit of a cold image may be a challenge. Additionally, applications may store data in application specific formats, including database specific formats, mail system formats, and/or other application specific formats. Such application specific formats may be difficult to parse or interpret without the use of the application itself. Furthermore, application data for a single application instance may be stored in a plurality of data structures and may be stored in different formats and in different locations. For example, a database may have multiple log files and/or other files, such as control files. Thus, accessing a cold image without the use of an associated operating system and/or application, may make it difficult to identify, parse, perform a full recovery of application data, and/or perform a partial or granular recovery of application data.

Moreover, with increased use of virtualization, there may be a growing number of virtual machine image files, such as for example, Virtual Machine DisK format (VMDK) files. These virtual machine image files may store data associated with a virtual machine. It may be desirable to access one or more portions of data of a virtual machine, or of applications of a virtual machine, when the virtual machine is not running. However, identifying, parsing, and/or recovering one or more files associated with a virtual machine that is not running may be not conventionally feasible.

In view of the foregoing, it may be understood that there are significant problems and shortcomings associated with current cold image data recovery technologies.

SUMMARY OF THE DISCLOSURE

Techniques for recovering data from cold images are disclosed. In one particular exemplary embodiment, the techniques may be realized as a computer implemented method for recovering data from cold images comprising searching storage associated with a target recovery device, identifying one or more data structures on the storage, parsing the one or more identified data structures, and recovering one or more portions of the one or more parsed data structures.

In accordance with other aspects of this particular exemplary embodiment, the one or more data structures may be associated with a virtual machine image file.

In accordance with further aspects of this particular exemplary embodiment, the method may further comprise booting the target recovery device using an alternative boot process.

In accordance with additional aspects of this particular exemplary embodiment, the alternative boot process may comprise booting from instructions stored in a location not specified as a default boot location of the target recovery device.

In accordance with additional aspects of this particular exemplary embodiment, the alternative boot process may comprise booting from instructions stored on at least one of: a CD, a DVD, flash memory, a floppy disk, a hard disk, network accessible storage, and magnetic tape.

In accordance with additional aspects of this particular exemplary embodiment, the one or more data structures may comprise data structures associated with an application.

In accordance with additional aspects of this particular exemplary embodiment, the one or more data structures may comprise at least one of: a data structure associated with a database, a data structure associated with Microsoft Exchange, and a data structure associated with Microsoft Active Directory.

In accordance with additional aspects of this particular exemplary embodiment, identifying one or more data structures on the storage may comprise utilizing metadata associated with an application to identify one or more data structures associated with storage of application data.

In accordance with additional aspects of this particular exemplary embodiment, the metadata may comprise at least one of: a file name, a directory name, a path, a registry entry, a system variable, a file extension, a date stamp, and one or more portions of a file header.

In accordance with additional aspects of this particular exemplary embodiment, the method may further comprise using data from the one or more parsed data structures to identify one or more additional data structures associated with an application.

In accordance with additional aspects of this particular exemplary embodiment, parsing the one or more identified data structures may comprise at least one of reading data in an application specific format, using an executable component associated with an application to parse data stored in an application specific format, and parsing data stored in a standardized format.

In accordance with additional aspects of this particular exemplary embodiment, the one or more recovered portions of the one or more parsed data structures may comprise a full recovery.

In accordance with additional aspects of this particular exemplary embodiment, the one or more recovered portions of the one or more parsed data structures may comprise a partial recovery.

In accordance with additional aspects of this particular exemplary embodiment, at least one processor readable medium for storing a computer program of instructions may be configured to be readable by at least one processor for instructing the at least one processor to execute a computer process for performing the method.

In another particular exemplary embodiment, the techniques may be realized as an article of manufacture for recovering data from cold images, the article of manufacture comprising at least one processor readable medium, and instructions carried on the at least one medium, wherein the instructions are configured to be readable from the at least one medium by at least one processor and thereby cause the at least one processor to operate so as to search storage associated with a target recovery device, identify one or more data structures on the storage, parse the one or more identified data structures, and recover one or more portions of the one or more parsed data structures.

In yet another particular exemplary embodiment, the techniques may be realized as a system for recovering data from cold images comprising one or more processors configured to search storage associated with a target recovery device, identify one or more data structures on the storage, parse the one or more identified data structures, and recover one or more portions of the one or more parsed data structures.

In accordance with other aspects of this particular exemplary embodiment, the data structures on the storage may be associated with a virtual machine image file.

In accordance with further aspects of this particular exemplary embodiment, the one or more processors may be further configured to boot the target recovery device using an alternative boot process.

In accordance with additional aspects of this particular exemplary embodiment, the data structures on the storage may be associated with an application.

In accordance with additional aspects of this particular exemplary embodiment, the one or more processors may further be configured to utilize metadata associated with an application to identify one or more data structures associated with storage of application data.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
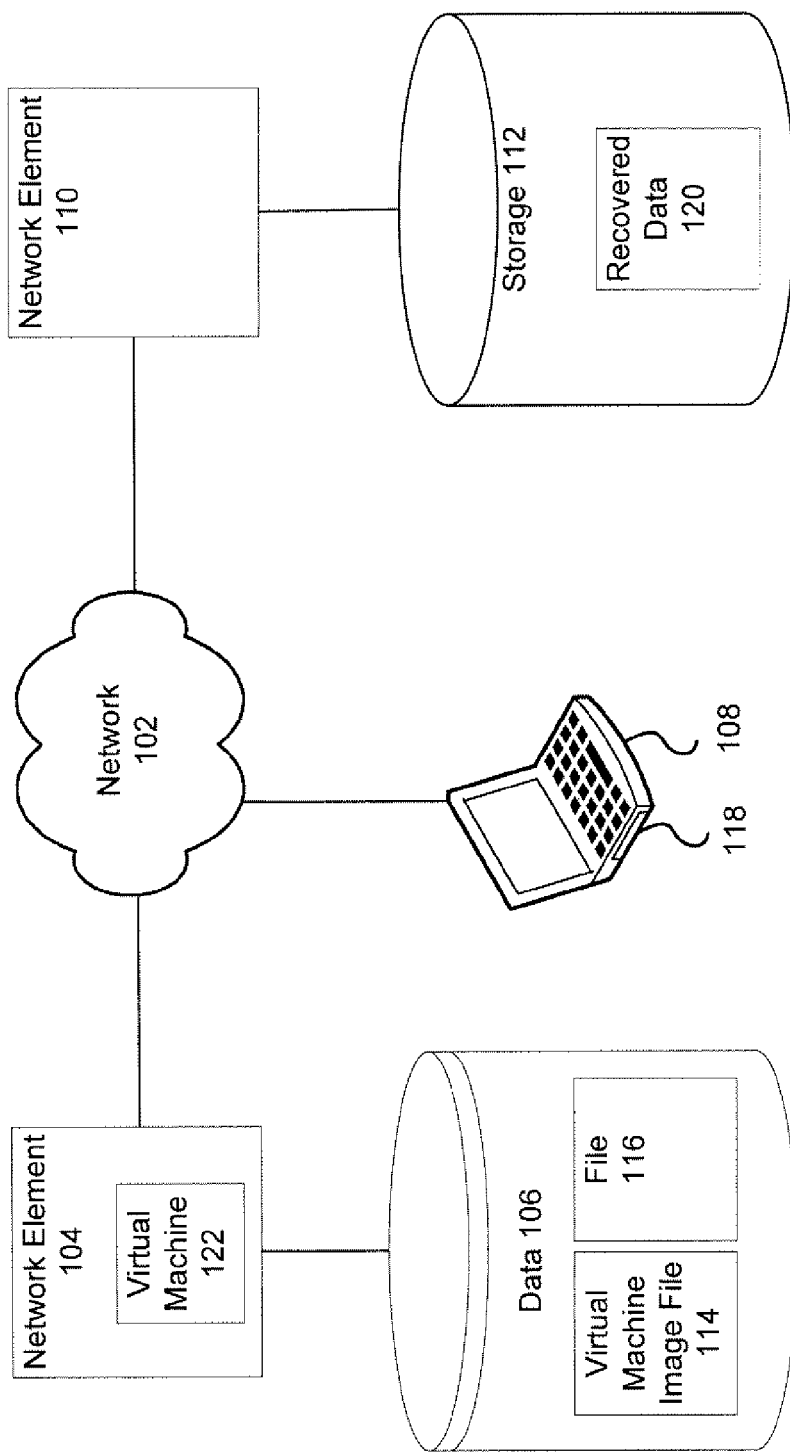
FIG. 1 shows a system for full or granular recovery of data from cold images, in accordance with an embodiment of the present disclosure.

Referring to FIG. 1, there is shown a system 100 for recovering of data from cold images in accordance with an embodiment of the present disclosure.

Network 102 may be a local area network (LAN), a wide area network (WAN), the Internet, a cellular network, a satellite network, or another network that permits communication between network element 104, network element 110, computer 108, and other devices communicatively coupled to network 102. Computer 108 may contain media interface 118. Network element 110 may be communicatively coupled to storage 112. Storage 112 may contain recovered data 120. Network element 104 may be communicatively coupled to data 106. Data 106 may contain virtual machine image file 114 and file 116.

Computer 108 may be a desktop computer, a laptop computer, a server, or other computer capable of performing private network backbone analysis. Computer 108 may receive data from user input, a database, a file, a web service, and/or an application programming interface. Computer 108 may contain one or more components, such as media interface 118. Media interface 118 may be a CD drive, a DVD drive, a flash memory interface (e.g., a card drive, a USB port attached to a USE flash drive), a floppy disk, a hard disk, or other storage interface. In one or more embodiments, computer 108 may provide a user interface for a recovery application and may enable the input of recovery parameters, the display of recovery data, and other recovery application functionality.

Network elements 104 and 110 may be application servers, backup servers, network storage devices, media servers or other devices communicatively coupled to network 102. For example, network elements 104 and 110 may be hosts, such as application servers, which may process data traveling between themselves and a backup device, a backup process, and/or storage.

In one particular exemplary embodiment, network element 110 may be a backup and/or recovery server attached to storage 112. In one or more other embodiments, network element 110 may represent a network appliance connected to a storage area network. In one or more embodiments, network element 110 may be capable of processing data received from or transmitted to storage 112.

Storage 112 may be network accessible storage and may be local, remote, or a combination thereof to network element 110. Storage 112 may utilize a tape, disk, a storage area network (SAN), or other computer accessible storage. In one or more embodiments, storage 112 may be a database. Storage 112 may contain recovered data 120. Recovered data 120 may include one or more portions of data recovered from one or more cold images. Recovered data 120 may contain individual files, portions of application data storage (e.g., database files), or a fully recovered application data set. In one or more embodiments, recovered data 120 may be a full or partial recovered set of application data enabling the running of an application utilizing the data.

Data 106 may be network accessible storage and may be local, remote, or a combination thereof to network elements 104, and 110. Data 106 may utilize a tape, disk, a storage area network (SAN), or other computer accessible storage. In one or more embodiments, data 106 may represent a database or another application instance. Virtual machine image file 114 may be a Virtual Machine DisK format (VMDK) file or other file that may store data associated with a virtual machine. File 116 may be one or more portions of an application data store including, but not limited to, a data structure associated with a database, a data structure associated with Microsoft Exchange, and a data structure associated with Microsoft Active Directory.

In one or more embodiments, a recovery process may recover one or more portions of a cold image file on data 106. For example, a recovery process may attempt to recover data from a virtual machine 122 that crashed or was shutdown on network element 104. The virtual machine 122 may have stored data in virtual machine image file 114 prior to crashing or shutting down. The recovery process may run on network element 104, network element 110, computer 108 or on another computing platform with network access to virtual machine image file 114.

A recovery process may receive one or more inputs from a user specifying a recovery target. The recovery target may be the entire virtual machine image file 114 or a portion of the virtual machine image file 114, such as data from an application on the virtual machine 122. The recovery process may parse the virtual machine image file 114 directly or may use an API, an executable component associated with a virtualization platform used by the virtual machine, or another utility capable of parsing a virtual machine image file. In one or more embodiments, the recovery process may attempt to boot the virtual machine 122 using an alternative boot image.

If the target of the recovery process is application data associated with virtual machine image file 114, additional parsing utilities and/or code may be utilized. For example, if a Microsoft Exchange Server™ was running on the virtual machine 122 and the recovery of one or more portions of Exchange data from virtual machine image file 114 is desired, the recovery process may utilize an application specific utility. For example, a recovery process may use a Microsoft jet API via an ese.dll file. This may enable a recovery process to parse a Microsoft Exchange specific data file such as an Exchange DataBase (EDB) file.

In one or more embodiments, multiple virtual machine image file 114 may comprise multiple virtual machine image files. If virtual machine 122 is not running, determining the correct files and the location of the files may be more challenging. However, the recovery process may use application specific metadata to identify and locate the proper files to recover the entire Exchange instance or a portion of the Exchange instance (e.g., one or more emails).

Application specific metadata for Exchange or for other applications may include a file name, a directory name, a path, a registry entry, a system variable, a file extension, a date stamp, and one or more portions of a file header. For example, a recovery process recovering one or more portions of an Exchange instance may utilize metadata including configurable directories for each storage group, a system files path, a log files path, a configurable path for one or more Exchange databases, a database file (EDB) path, and a streaming database file (STM) path. A recovery process may scan one or more cold images such as virtual machine image file 114 in order to find one or more Exchange log files. The recovery process may then parse the one or more Exchange log files. The Exchange log files may contain header information and/or other metadata such as paths, signatures, and/or timestamps. The metadata information of the one or more Exchange log files may specify paths to databases associated with the Exchange log files. The signatures and/or timestamps of the one or more Exchange log files may identify a unique set of Exchange log files and Exchange databases and may distinguish such files from those of a separate version or Exchange instance.

By analyzing paths, files and/or other metadata gathered, a recovery process may be able to gain enough data and information to mount an Exchange database and perform a full or granular recovery. For example, a recovery process may be capable of recovering an entire Exchange database or one or more emails or other files in an Exchange database. In one or more embodiments, network element 110 may be a recovery platform and a recovery process may transfer data to recovered data 120. In some embodiments, this may enable the running of a second application instance on network element 110 utilizing recovered data 120.

A recovery process may also be capable of recovering one or more portions of other application data stores, such as a SQL Server Database, Active Directory storage, a Oracle database, Lotus Notes database, and a DB2 database. Based on a target type specified by a user, a recovery process may have specified metadata such as paths, extensions, directory names, file header information, system variables or parameters, and file names, which the recovery process may seek and parse. Thus, a recovery process may contain or have access to sufficient application structure information to perform a granular or full recovery of an application without requiring a user to identify files, paths, and other application specific details. Such a recovery process may be provided with a volume or other storage unit to search and an application name or other high level target information (e.g.—"recover Exchange email from server A").

A recovery process may also recover a file written in a standard format that is not part of an application data store. For example, a recovery process may parse and/or recover file 116. In one or more embodiments, file 116 may be a file stored in a standardized format, such as .txt files, .csv files, .tar files, .zip files, .jar files, .rtf files, .jpg files, .xls files, .doc files, or other standardized non-proprietary and proprietary formats.

In one or more embodiments, a recovery process may recover data from storage associated with a computing platform that is not booted. The boot information for the computing platform may be damaged, inaccessible to the recovery process, or a full boot up of the computing platform may not be desirable. The recovery process may boot the recovery platform using an alternative boot location. For example, in one or more embodiments, a recovery process may attempt the recovery of a cold image file on computer 108. Computer 108 may utilize a boot image provided on media interface 118, such as for example, a bootable CD with a minimal operating system and recovery instructions. A recovery process may also utilize a minimum amount of boot information on media interface 118 and may utilize network booting and may execute network accessible recovery instructions.

In one or more embodiments, a recovery process may recover data from a damaged application store or from damaged storage of a computing platform. For example, parsing of application data stores may enable recovery of one or more portions of data when an application is unable to initialize or mount.

Figure 2:
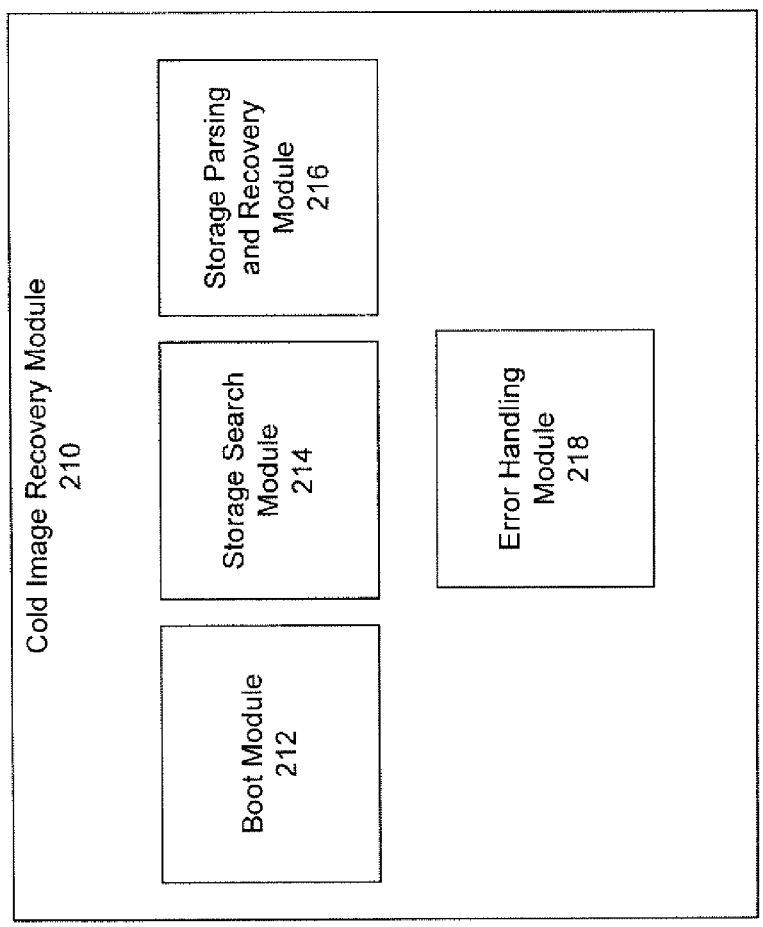
FIG. 2 shows a module for full or granular recovery of data from cold images, in accordance with an embodiment of the present disclosure.

Referring to FIG. 2, there is shown a cold image recovery module 210 for full or granular recovery of data from cold images, in accordance with an embodiment of the present disclosure. Cold image recovery module 210 may contain one or more components including boot module 212, storage search module 214, storage parsing and recovery module 216, and error handling module 220.

Boot module 212 may provide one or more alternative boot locations and may facilitate booting of a computing platform associated with a recovery target. Boot module 212 may enable access of a volume associated with an operating system which has failed or is unavailable. Boot module 212 may enable network booting, booting off of removable storage media, or other alternative boot locations.

Storage search module 214 may search storage associated with a computing platform associated with a recovery target. Storage search module 214 may utilize paths, extensions, directory names, file header information, system variables or parameters, file names, and other metadata. Storage search module 214 may search alternative locations and extensions based upon a specified recovery target, an application associated with a recovery target, or other recovery criteria specified by a user. Storage search module 214 may identify a first data structure, such as a log file. Storage search module 214 may then search for other data structures based at least in part on information provided by parsing the first identified data structure by storage parsing and recovery module 216.

Storage parsing and recovery module 216 may parse one or more data structures associated with a recovery target. Storage parsing and recovery module 216 may be capable of parsing a file, such as a log file, a SQL server file, or another file directly. In one or more embodiments, storage parsing and recovery module 216 may utilize a component or a utility to access an application storage file. For example, storage parsing and recovery module 216 may use a Microsoft jet API and/or an (Extensible Storage Engine) ese.dll file to parse an Exchange Server or Active Directory file. In one or more embodiments, storage parsing and recovery module 216 may use other Indexed Sequential Access Mechanisms (ISAMs) to access application data associated with a recovery target.

Error handling module 220 may handle errors with booting, file access, file parsing, data recovery, and other recovery issues. Error handling module 220 may log errors, such as errors occurring during data recovery. Error handling module 220 may generate and/or provide one or more reports. Such reports may contain recovery information, recovered data, errors, and information associated with recovery target damage or data loss. For example, error handling module 220 may identify one or more unrecoverable portions of a recovery target due to physical damage, such as damaged disk sectors, file corruption, or other issues.

Figure 3:
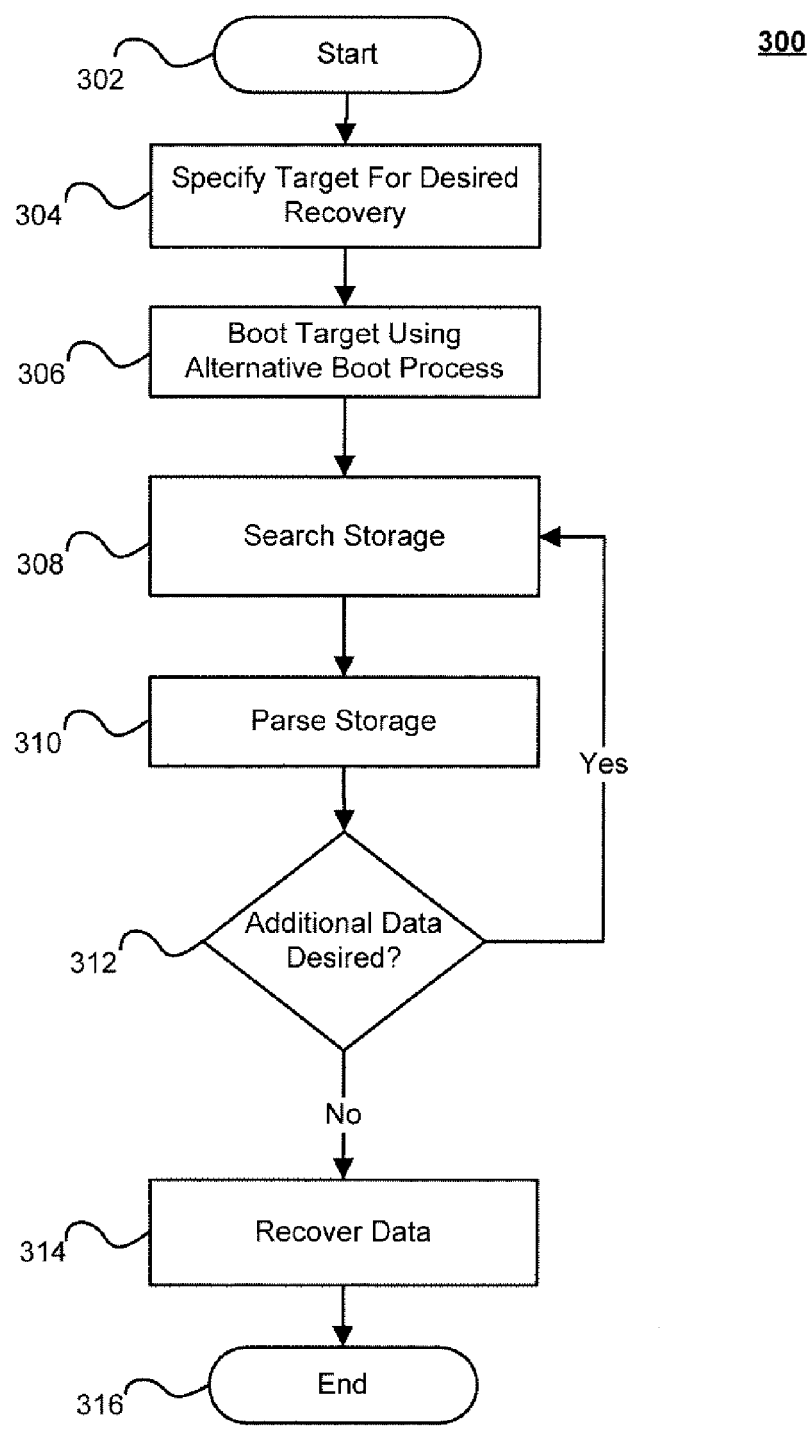
FIG. 3 depicts a method for full or granular recovery of data from cold images, in accordance with an embodiment of the present disclosure.

Referring to FIG. 3, there is shown a method 300 for providing a differential application level backup in accordance with an embodiment of the present disclosure.

At block 302, the method 300 for providing a differential application level backup may begin.

At block 304, the method 300 may specify a target for recovery. For example, a user at computer 108 may specify a recovery target, such as storage associated with a computing platform and/or an application instance.

At block 306, the method 300 may boot a computing platform associated with a recovery target using an alternative boot process. For example, a user may provide removable storage media containing executable boot instructions or may specify a network location for network based booting. In one or more embodiments, booting may not be performed. For example, a physical computing platform may be running, but a virtual machine or a virtualization platform, such as VMWare, may not be. The method 300 may then have access to one or more virtual machine image files without performing a boot process.

At block 308, the method 300 may search storage, such as a volume, associated with a recovery target. The method 300 may utilize metadata associated with an application type or a recovery target to provide search criteria. One or more files or other data structures may be identified.

At block 310, the method 300 may parse the one or more identified data structures. Parsing of the data structures may provide additional metadata to ensure that all data and/or files associated with a recovery target are identified. For example, parsing of a log file associated with a database to be recovered may identify one or more additional database files. Furthermore, parsing of a data file may verify an identify of the file by timestamps, signatures, file header information, or other data.

At block 312 it may be determined whether additional data is desired. If parsing of one or more identified files has provided criteria to identify further files (e.g., additional log files, an MDB file), the method 300 may return to block 308. If no further files are identified and/or needed, the method 300 may continue to block 314.

At block 314, one or more portions of data may be recovered. Such data recovery may be performed by parsing one or more identified files, by mounting a database, by instantiating an application instance, and/or by utilizing an application recovery API or utility.

At block 316, the method 300 may end.

At this point it should be noted that full and granular recovery from cold images in accordance with the present disclosure as described above typically involves the processing of input data and the generation of output data to some extent. This input data processing and output data generation may be implemented in hardware or software. For example, specific electronic components may be employed in a data recovery module or similar or related circuitry for implementing the functions associated with full and granular recovery from cold images in accordance with the present disclosure as described above. Alternatively, one or more processors operating in accordance with instructions may implement the functions associated with full and granular recovery from cold images in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer implemented method for recovering data from cold images comprising:
    searching primary storage of a target recovery device having an operating system stored on the primary storage that is not running;
    identifying one or more structures on the primary storage;
    parsing, using at least one computer processor, the one or more identified data structures; and
    recovering one or more portions of the one or more parsed data structures, wherein recovery comprises reading the one or more portions of the one or more parsed data structures from the primary storage of the target recovery device.

2. The computer implemented method of claim 1, wherein the one or more data structures are associated with a virtual machine image file.

3. The computer implemented method of claim 1, further comprising:
    booting the target recovery device using an alternative boot process.

4. The computer implemented method of claim 3, wherein the alternative boot process comprises booting from instructions stored in a location not specified as a default boot location of the target recovery device.

5. The computer implemented method of claim 3, wherein the alternative boot process comprises booting from instructions stored on at least one of: a CD, a DVD, flash memory, a floppy disk, a hard disk, network accessible storage, and magnetic tape.

6. The computer implemented method of claim 1, wherein the one or more data structures comprise data structures associated with an application.

7. The computer implemented method of claim 1, wherein the one or more data structures comprise at least one of: a data structure associated with a database, a data structure associated with Microsoft Exchange, and a data structure associated with Microsoft Active Directory.

8. The computer implemented method of claim 1, wherein identifying one or more data structures on the primary storage comprises:
   utilizing metadata associated with an application to identify one or more data structures associated with storage of application data.

9. The computer implemented method of claim 8, wherein the metadata comprises at least one of: a file name, a directory name, a path, a registry entry, a system variable, a file extension, a date stamp, and one or more portions of a file header.

10. The computer implemented method of claim 1, further comprising using data from the one or more parsed data structures to identify one or more additional data structures associated with an application.

11. The computer implemented method of claim 1, wherein parsing the one or more identified data structures comprises at least one of:
   reading data in an application specific format, using an executable component associated with an application to parse data stored in an application specific format, and parsing data stored in a standardized format.

12. The computer implemented method of claim 1, wherein the one or more recovered portions of the one or more parsed data structures comprise a full recovery.

13. The computer implemented method of claim 1, wherein the one or more recovered portions of the one or more parsed data structures comprise a partial recovery.

14. At least one non-transitory processor readable storage medium for storing a computer program of instructions configured to be readable by at least one processor for instructing the at least one processor to execute a computer process for performing the method as recited in claim 1.

15. An article of manufacture for recovering data from cold images, the article of manufacture comprising:
   at least one non-transitory processor readable storage medium; and
   instructions carried on the at least one storage medium;
   wherein the instructions are configured to be readable from the at least one storage medium by at least one processor and thereby cause the at least one processor to operate so as to:
      search primary storage associated with a target recovery device having an operating system stored on the primary storage that is not running;
      identify one or more data structures on the primary storage;
      parse the one or more identified data structures; and
      recover one or more portions of the one or more parsed data structures, wherein recovery comprises reading the one or more portions of the one or more parsed data structures from the primary storage of the target recovery device.

16. A system for recovering data from cold images comprising:
   one or more processors configured to:
      search primary storage associated with a target recovery device having an operating system stored on the primary storage that is not running;
      identify one or more data structures on the primary storage;
      parse the one or more identified data structures; and
      recover one or more portions of the one or more parsed data structures, wherein recovery comprises reading the one or more portions of the one or more parsed data structures from the primary storage of the target recovery device.

17. The system of claim 16, wherein the data structures on the primary storage are associated with a virtual machine image file.

18. The system of claim 16, wherein the one or more processors are further configured to:
   boot the target recovery device using an alternative boot process.

19. The system of claim 16, wherein the data structures on the primary storage are associated with an application.

20. The system of claim 16, wherein the one or more processors are further configured to:
   utilize metadata associated with an application to identify one or more data structures associated with storage of application data.

* * * * *